(12) United States Patent
Guo

(10) Patent No.: US 12,113,599 B2
(45) Date of Patent: Oct. 8, 2024

(54) APPARATUS AND METHOD FOR BEAM FAILURE RECOVERY

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 345 days.

(21) Appl. No.: 17/524,621

(22) Filed: Nov. 11, 2021

(65) Prior Publication Data
US 2022/0200687 A1 Jun. 23, 2022

Related U.S. Application Data

(63) Continuation of application No. PCT/CN2019/122757, filed on Dec. 3, 2019.
(Continued)

(51) Int. Cl.
*H04B 7/06* (2006.01)
*H04W 72/044* (2023.01)
(Continued)

(52) U.S. Cl.
CPC ........ *H04B 7/0695* (2013.01); *H04W 72/046* (2013.01); *H04W 72/21* (2023.01); *H04W 74/0833* (2013.01); *H04W 76/19* (2018.02)

(58) Field of Classification Search
CPC ... H04B 7/0695; H04B 7/088; H04W 72/046; H04W 72/21; H04W 74/0833;
(Continued)

(56) References Cited

U.S. PATENT DOCUMENTS

2019/0200248 A1* 6/2019 Basu Mallick ....... H04W 24/04
2019/0215048 A1* 7/2019 Cirik ..................... H04W 76/19
(Continued)

FOREIGN PATENT DOCUMENTS

| WO | 2018128363 A1 | 7/2018 | |
| WO | 2019032497 A1 | 2/2019 | |
| WO | WO-2021027185 A1 * | 2/2021 | ............. H04B 7/022 |

OTHER PUBLICATIONS

Fujitsu: "Remaining PUCCH spatial filtering issues on beam failure recovery", R1-1810480, 3GPP TSG RAN WG1 Meeting #94bis, Chengdu, China, Oct. 8-12, 2018 (Year: 2018).*
(Continued)

*Primary Examiner* — Ayaz R Sheikh
*Assistant Examiner* — Louis Samara
(74) *Attorney, Agent, or Firm* — BAYES PLLC

(57) ABSTRACT

An apparatus and a method for beam failure recovery are provided. The apparatus, such as a user equipment device, detects a first set of beam failure detection reference signals (RSs) associated with a first control resource set (CORESET) group identifier (ID), and measures the first set of beam failure detection RSs to detect a first beam failure event associated with the first CORESET group ID. The apparatus transmits a first beam failure recovery request message associated with the first CORESET group ID upon detecting the first beam failure event, and monitors a search space for a first beam failure recovery response responding to the first beam failure recovery request.

18 Claims, 6 Drawing Sheets

Related U.S. Application Data

(60) Provisional application No. 62/886,043, filed on Aug. 13, 2019.

(51) Int. Cl.
   *H04W 72/21* (2023.01)
   *H04W 74/0833* (2024.01)
   *H04W 76/19* (2018.01)

(58) Field of Classification Search
   CPC ....... H04W 76/19; H04W 24/04; H04W 4/40; H04W 72/02; H04L 5/0035; H04L 5/0051
   See application file for complete search history.

(56) References Cited

U.S. PATENT DOCUMENTS

| | | | |
|---|---|---|---|
| 2020/0274606 A1* | 8/2020 | Kang | H04L 5/0051 |
| 2020/0404559 A1* | 12/2020 | Koskela | H04B 7/088 |
| 2021/0314917 A1* | 10/2021 | Lee | H04W 72/02 |
| 2021/0336688 A1* | 10/2021 | Lee | H04W 4/40 |
| 2022/0311577 A1* | 9/2022 | Matsumura | H04L 5/0035 |

OTHER PUBLICATIONS

AT&T, "On beam recovery for partial and full control channel failure", 3GPP TSG RAN WG1 Meeting NR#3 R1-1716690, Nagoya, Japan, Sep. 18-21, 2017 (Year: 2017).*

Supplementary Search Report Dated Jun. 1, 2022 From the Extended European Search Report (EESR) of the Application No. 19941589.4, 10 pages.

Fujitsu: "Remaining PUCCH spatial filtering issues on beam failure recovery", R1-1810480, 3GPP TSG RAN WG1 Meeting #94bis, Chengdu, China, Oct. 8-12, 2018, 3 pages.

VIVO: "Remaining issues on mechanism to recover from beam failure", R1-1806045, 3GPP TSG RAN WG1 Meeting #93, Busan, Korea, May 21-25, 2018, 2 pages.

International Search Report and the Written Opinion Dated May 9, 2020 From the International Searching Authority Re. Application No. PCTCN2019122757, 9 pages.

AT&T, "On beam recovery for partial and full control channel failure", 3GPP TSG RAN WG1 Meeting NR#3 R1-1716690, Nagoya, Japan, Sep. 18-21, 2017, 7 pages.

The Examination Report dated Jun. 2, 2023 from European patent application No. 19941589.4.

* cited by examiner

APPARATUS AND METHOD FOR BEAM FAILURE RECOVERY

CROSS-REFERENCE TO RELATED APPLICATION

This application is a continuation of International Application No. PCT/CN2019/122757, filed on Dec. 3, 2019, which claims the benefit of priority to U.S. Application No. 62/886,043, filed on Aug. 13, 2019, both of which are hereby incorporated by reference in their entireties.

BACKGROUND

The present disclosure relates to the field of communication systems, and more particularly, to an apparatus and a method for beam failure recovery.

Current design of physical downlink control channel (PDCCH), as specified in 3rd generation partnership project (3GPP) release 15, can only support transmitting PDCCH from a single transmission reception point (TRP). A TRP with best channel condition may be selected to transmit the PDCCH to a user equipment (UE). In current design of beam failure recovery, the beam failure recovery procedure is conducted over all the PDCCHs, which is not able to differentiate different TRPs in a multi-TRP system. The UE can claim beam failure and send beam failure recovery request to the network only when all the CORESETs meet beam failure. This method does not work for multi-TRP system. It cannot support that the UE detects beam failure for each individual TRP and then gNB recovery every failed TRP. With current design, the system has to wait until when all the TRPs have beam failure, which is not desired for multi-TRP operation.

Therefore, there is a need for an apparatus and a method for beam failure recovery.

SUMMARY

An object of the present disclosure is to propose an apparatus and a method of a beam failure recovery.

In a first aspect of the present disclosure, a method of a beam failure recovery for a user equipment (UE) includes detecting a first set of beam failure detection reference signals (RSs) associated with a first control resource set (CORESET) group identifier (ID); measuring the first set of beam failure detection RSs to detect a first beam failure event associated with the first CORESET group ID; transmitting a first beam failure recovery request message associated with the first CORESET group ID when the first beam failure event is detected; and monitoring a search space for a first beam failure recovery response which responds to the first beam failure recovery request.

In a second aspect of the present disclosure, an apparatus of a beam failure recovery includes a transceiver, and a processor coupled to the transceiver. The transceiver receives reference signals (RSs). The processor detects a first set of beam failure detection RSs associated with a first control resource set (CORESET) group identifier (ID). The processor measures the first set of beam failure detection RSs to detect a first beam failure event associated with the first CORESET group ID. The processor transmits a first beam failure recovery request message associated with the first CORESET group ID when the first beam failure event is detected. The processor monitors a search space for a first beam failure recovery response which responds to the first beam failure recovery request.

In a third aspect of the present disclosure, a method of a beam failure recovery includes detecting a first set of beam failure detection reference signals (RSs) associated with a first control resource set (CORESET) group identifier (ID) and a second set of beam failure detection RSs associated with a CORESET group ID; measuring the first set of beam failure detection RSs to detect a first beam failure event associated with the first CORESET group ID and the second set of beam failure detection RSs to detect a second beam failure event associated with the second CORESET group ID; transmitting a first beam failure recovery request message associated with the first CORESET group ID when the first beam failure event is detected, and a second beam failure recovery request message associated with the second CORESET group ID when the second beam failure event is detected; and monitoring a first search space for a first beam failure recovery response which responds to the first beam failure recovery request and a second search space for a second beam failure recovery response which responds to the second beam failure recovery request.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Figure 1:
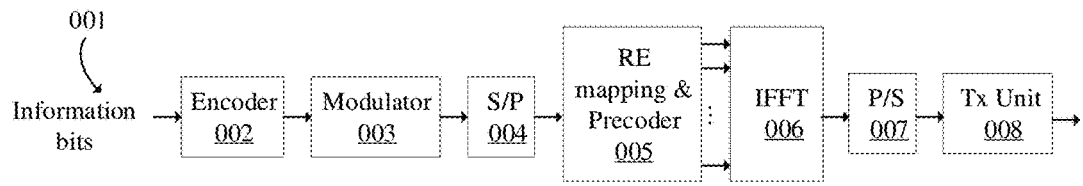
FIG. 1 illustrates a transmitter block diagram for a downlink (DL) or uplink (UL) transmission.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Fifth-generation (5G) wireless systems are generally a multi-beam based system in a frequency range 2 (FR2) ranging from 24.25 GHz to 52.6 GHz, where multiplex transmit (Tx) and receive (Rx) analog beams are employed by a base station (BS) and/or a user equipment (UE) to combat a large path loss in a high frequency band. In a high frequency band system, for example, mmWave systems, the BS and the UE are deployed with large number of antennas, so that a large gain beamforming can be used to defeat the large path loss and signal blockage. Due to the hardware limitation and cost, the BS and the UE might only be equipped with a limited number of transmission and reception units (TXRUs). Therefore, hybrid beamforming mechanisms can be utilized in both BS and UE. To get the best link quality between the BS and the UE, the BS and the UE need to align analog beam directions for a particular downlink or uplink transmission. For a downlink transmission, the BS and the UE need to find the best pair of a BS Tx beam and a UE Rx beam while for an uplink transmission, the BS and the UE need to find the best pair of the UE Tx beam and the BS Rx beam.

For a communication between one UE and a BS, the BS and the UE need to determine which Tx and Rx beam are going to be used. When one UE moves, the beams used by the BS and the UE for communication might change. In 3GPP 5G specification, the following functions are defined to support such multi-beam-based operation.

At an operation associated with beam measurement and reporting, in this function, the UE can measure one or multiple Tx beams of the BS and then the UE can select the best Tx beam and report his selection to the BS. By measuring the Tx beams of the BS, the UE can also measure one or more different Rx beams and then select the best Rx beam for one particular Tx beam of the BS. In this function, the gNB can also measure one or multiple Tx beams of the UE and then select the best Tx beam of the UE for an uplink transmission. To support measuring Tx beams of the BS, the BS can transmit multiple reference signal (RS) resources and then configures the UE to measure the RS resources. Then, the UE can report an index of one or more selected RS resources that are selected based on some measure metric, for example, a layer 1 reference signal received power (L1-RSRP). To support measuring Tx beams of the UE used for an uplink transmission, the BS can configure the UE to transmit one or more uplink RS resources, for example, sounding reference signal (SRS) resources, and then the BS can measure the RS resources. The BS can figure out which Tx beam of the UE is the best for the uplink transmission based on measuring, for example, L1-RSRP of the RS resources.

At an operation associated with beam indication, for a downlink transmission, the BS can indicate the UE of which Tx beam of the BS is used to transmit, so that the UE can use proper Rx beam to receive the downlink transmission. For a physical downlink control channel (PDCCH) transmission, the BS can indicate an identify (ID) of one Tx beam of the BS to the UE. For a physical sidelink discovery channel (PSDCH) transmission, the BS can use downlink control information (DCI) in a PDCCH to indicate the ID of one Tx beam that is used to transmit a corresponding physical downlink shared channel (PDSCH). For an uplink transmission from the UE, the BS can also indicate the UE of which Tx beam of the UE to be used. For example, for a physical uplink control channel (PUCCH) transmission, the UE uses a Tx beam that is indicated by the BS through a configuration of spatial relation information. For an SRS transmission, the UE uses the Tx beam that is indicated by the BS through the configuration of spatial relation information. For a physical uplink shared channel (PUSCH) transmission, the UE uses a Tx beam that indicated by an information element contained in a scheduling DCI.

At an operation associated with beam switch, this function is used by the BS to switch a Tx beam used for a downlink or uplink transmission. This function is useful when the Tx beam used for transmission currently is out of date due to for example a movement of the UE. When the BS finds a Tx beam currently used for a downlink transmission is not good or the BS finds another Tx beam that is better than the current Tx beam, the BS can send signaling to the UE to inform a change of Tx beam. Similarly, the BS can switch an uplink Tx beam of the UE used to transmit some uplink transmission.

In a communication system, such as a new radio (NR) system, DL signals can include control signaling conveying DCI through a PDCCH, data signals conveying information packet through a PDSCH and some types of reference signals. The DCI can indicate information of how the PDSCH is transmitted, including for example resource allocation and transmission parameters for the PDSCH. The BS can transmit one or more types of reference signals for different purposes, including a demodulation reference symbol (DM-RS) that is transmitted along with the PDSCH and can be used by the UE to demodulate the PDSCH, a channel state information reference signal (CSI-RS) that can be used by the UE to measure BS's Tx beam or CSI of a downlink channel between the BS and the UE, a phase tracking reference signal (PT-RS) that is also transmitted along with a PDSCH and can be used by the UE to estimate a phase noise caused by imperfection in a radio frequency (RF) part in a transmitter and a receiver and then compensate it when decoding the PDSCH. In NR, DL resource allocation for PDCCH, PDSCH, and reference signals is performed in a unit of orthogonal frequency division multiplexing (OFDM) symbols and a group of physical resource blocks (PRBs). Each PRB contains a few resource elements (REs), for example 12 REs, in a frequency domain. A transmission bandwidth (BW) of one downlink transmission consists of frequency resource unit called as resource blocks (RBs) and each RB consists of a few subcarriers or REs, for example, 12 subcarriers or 12 REs.

UL signals transmitted by the UE to the BS can include data signals conveying data packet through a PUSCH, uplink control signals conveying UL control information (UCI) which can be transmitted in the PUSCH or a PUCCH, and UL reference signals. The UCI can carry a schedule request (SR) used by the UE to request an uplink transmission resource, a hybrid automatic repeat request acknowledgement (HARQ-ACK) feedback for a PDSCH transmission or a channel state information (CSI) report. The UE can transmit one or more types of uplink reference signals for different purposes, including DM-RS that is transmitted along with a PUSCH transmission and can be used by the BS to demodulate the PUSCH, PT-RS that is also transmitted along with a PUSCH and can be used by the BS to estimate the phase noise caused by imperfection in RF parts and the BS then can compensate it when decoding PUSCH, and SRS signals that are used by the BS to measure one or more UE Tx beams or CSI of the uplink channel between the UE and the BS. Similarly, UL resource allocation for PUSCH, PUCCH, and UL reference signal is also performed in a unit of symbols and a group of PRBs.

A transmission interval for DL or UL channels/signals is referred to as a slot and each slot contains a few, for example 14, symbols in time domain. In a NR system, the duration of one slot can be 1, 0.5, 0.25 or 0.123 millisecond, for the subcarrier spacing 15 KHz, 30 KHz, 60 KHz, and 120 KHz, respectively. NR systems support flexible numerologies and an embodiment can choose proper OFDM subcarrier spacing based on the deployment scenario and service requirement. In the NR system, DL and UL transmission can use different numerologies.

FIG. 1 illustrates a transmitter block diagram for a DL or UL transmission. An embodiment of the transmitter block illustrated in FIG. 1 is for illustration only. Other embodiments could be used without departing from the scope of the present disclosure. Information bits 001 can be first encoded by an encoder 002 such as a low density parity check (LDPC) encoder or polar encoder, and then modulated by a modulator 003. The modulation can be, for example, binary phase-shift keying (BPSK), quadrature amplitude modulation (QAM) 4, QAM 16, QAM 64, or QAM 256. Then a serial to parallel (S/P) converter 004 can generate parallel multiple modulation symbols that are subsequently inputted to a RE mapper and precoder 005. The RE mapper and precoder 005 can map the modulation symbols to selected REs and then apply some precoder on the modulation symbols on the BW resource assigned to a DL or UL transmission. Then in 006, the modulation symbols are applied with an inverse fast fourier transform (IFFT) and an output thereof is then serialized by a parallel to serial (P/S) converter 007. Then the signals are sent to a Tx unit 008 including for example a digital-to-analog (D/A) convertor, a radio frequency convertor, a filter, a power amplified, and Tx antenna elements, and transmitted out.

Figure 2:
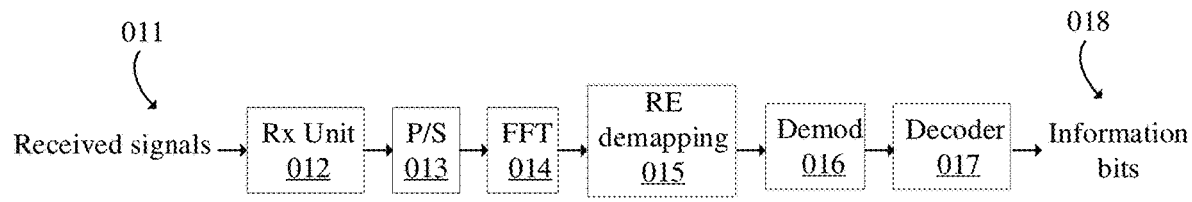
FIG. 2 illustrates a receiver block diagram for receiving a DL or UL transmission.

FIG. 2 illustrates a receiver block diagram for receiving a DL or UL transmission. An embodiment of the receiver block illustrated in FIG. 2 is for illustration only. Other embodiments could be used without departing from the scope of the present disclosure. Received signals 011 are first passed through a Rx unit 012 including for example Rx antenna elements, a low noise power amplifier, radio frequency converters, and filters. And an output thereof is passed through a P/S 013 and then applied an FFT 014. After converting into a frequency domain, useful signals are extracted by a RE demapping 015 according to a resource allocation for the DL or UL transmission. Subsequently, a demod 016 demodulates data symbols with a channel estimation that is calculated based on DM-RS and then a decoder 017 such as LDPC decoder or polar decoder, decodes the demodulated data to output information bits 018.

In NR 3GPP specification release 15, a UE can be configured with one CORESET, in which a set of time-frequency resource for PDCCH transmission is configured. For one CORESET, the UE can be configured with: a CORESET ID, PDCCH DM-RS scrambling init value, number of OFDM symbols used by that CORESET that defines the time-domain resource for that CORESET and the set of resource blocks that defines the frequency domain resource for that CORESET. The gNB can also configure an antenna quasi co-location (QCL) for the CORESET through higher layer parameter transmission configuration indicator (TCI)-state, which can be used by the UE to monitor the DM-RS for the PDCCH. For monitoring PDCCH, the gNB can configure a search space set for the UE. In one search space set, the gNB can configure the time and frequency location where the UE shall monitor PDCCH transmission. In the configuration of search space set, the gNB can also configure the number of PDCCH candidates and the candidate DCI formats that the UE shall be requested to expect. Through the configuration of one search space set, the gNB can provide the following information to the UE for monitoring PDCCH:

The index(es) of slots where the PDCCH would be transmitted;

The time-frequency resources within one slot, in which the PDCCH would be transmitted;

The number of PDCCH candidates for each CCE aggregation level; and

The DCI formats that can be transmitted in that PDCCH, for example DCI format 0_0 and DCI format 01, or DCI format 1_0 and DCI format 1_1.

In a communication system, such as a new radio (NR) system, multi-TRP transmission is introduced. In a multi-TRP NR system, a backhaul connection between TRPs can be ideal or non-ideal. Through a backhaul connection, low-latency and real-time collaboration between TRPs can be obtained, and the TRPs can collaborate dynamically for every single PDSCH transmission. In contrast, a system with non-ideal backhaul can only implement semi-static collaboration between TRPs where the TRPs can only exchange some semi-static configuration information, such as radio resource control (RRC) configurations. However, for each PDSCH transmission, the TRPs can only schedule and control the PDSCH separately and independently.

Figure 3:
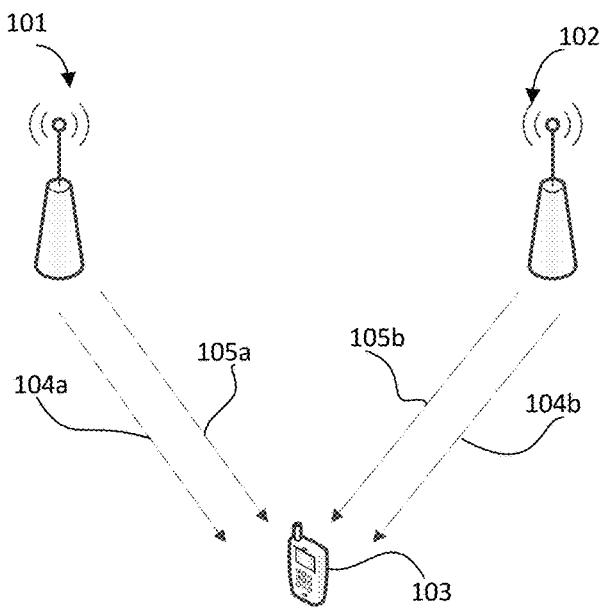
FIG. 3 illustrates a schematic diagram of a system for wireless communication according to an embodiment of the present disclosure.

The TRPs can schedule and control the transmission to a same UE separately. Each TRP can send a DCI to schedule PDSCH transmission independently. The UE receives DCI from each of the TRPs and then decode the PDSCH as indicated by that DCI. An example is shown in FIG. 3 for a NR multi-TRP system with two TRPs. The TRP 101 sends DCI 104a to schedule PDSCH 105a to the UE 103 and the TRP 102 sends DCI 104b to schedule PDSCH 105b to the UE 103. The TRP 101 and TRP 102 can be configured with different control resource sets (CORESETs) and different search space for PDCCH transmission. The UE 103 can detect PDCCH in different CORESETs and search space for the DCI 104a and 104b sent by the TRPs 101 and 102. The UE 103 is configured with multiple CORESETs and some of the CORESETs are used by TRP 101 and some of the CORESETs are used by TRP 102.

In a design of beam failure recovery, the UE 103 is configured to monitor the beam quality of all the UE-specific CORESETs. If all the CORESETs have failed beam, the UE can declare beam failure event. Then the UE 103 sends an uplink beam failure recovery request message to a gNB. The gNB may be a gNB connected to the TRPs 101 and 102. The uplink beam failure recovery request message may include an ID of a new beam, which is recommended by the UE 103 to the gNB for downlink transmission. After sending beam failure recovery request, the UE 103 begins monitoring a search space that is dedicated for beam failure response to detect DCI format. If the UE 103 can detect a valid DCI format from the dedicated search space, the UE 103 can determine that the gNB receives the beam failure recovery request successfully.

In 3rd generation partnership project (3GPP) release 15, a beam failure recovery function for a primary cell (PCell) is specified, which can be called as a link recovery. To perform a beam failure recovery for the primary cell, a user equipment can be configured with a set of reference signals (RSs) as a beam failure detection (BFD) RS and another set of RSs as a new beam identification (NBI) RS. The UE can first monitor the RS configured as the BFD RS and use a hypocritical block error rate (BLER) as metric to detect a beam failure of a physical downlink control channel (PDCCH) in one active bandwidth part (BWP) in the primary cell. If the UE detects the beam failure and the UE also finds at least one NBI RS that has a reference signal received power (RSRP) larger than a configured threshold, the UE then transmits a random access channel (RACH) preamble in a given RACH resource occasion which are configured to be associated with one NBI RS that is selected by the UE. A transmission of the RACH preamble in a given RACH resource can be considered as a beam failure recovery request (BFRR) to a gNB. If the gNB detects such a relay-assisted cellular network (RACN) preamble successfully, the gNB would use a quasi-co-location (QCL) assumption of the NBI RS indicated by the detected RACH preamble to transmit PDCCH in a search space that is dedicated for beam failure recovery response. After sending the RACH preamble as the BFRR, the UE can begin to monitor the PDCCH in the dedicated search space and if a valid PDCCH is detected, the UE can determine that the gNB has received the BFRR successfully.

In this disclosure, the methods of beam failure recovery in multi-TRP system are presented. According to the methods in an embodiment of the disclosure, a UE, such as the UE 103, operates beam failure recovery for each TRP in a multi-TRP system individually. The configuration of beam failure recovery is configured per CORESET group ID. In a given BWP, the UE monitors the PDCCH of all CORESETs associated with one CORESET group ID to detect beam failure for one given TRP. The UE declares beam failure event individually for CORESETs associated with each CORESET group ID, and sends beam failure recovery request individually for each CORESET group ID. Then the system can recover the failed TRP accordingly. For each TRP, the UE may identify a default Tx beam only for those PUCCH resources associated with the given CORESET group ID, that is associated with the given TRPs. That method is an essential feature to support link recovery function in the scenarios of non-ideal backhaul multi-TRP system, in which short-time collaboration between TRPs is not achievable and each TRP has to be recovered individually. Beam failure recovery and link recovery are interchangeably used in the description.

Figure 4:
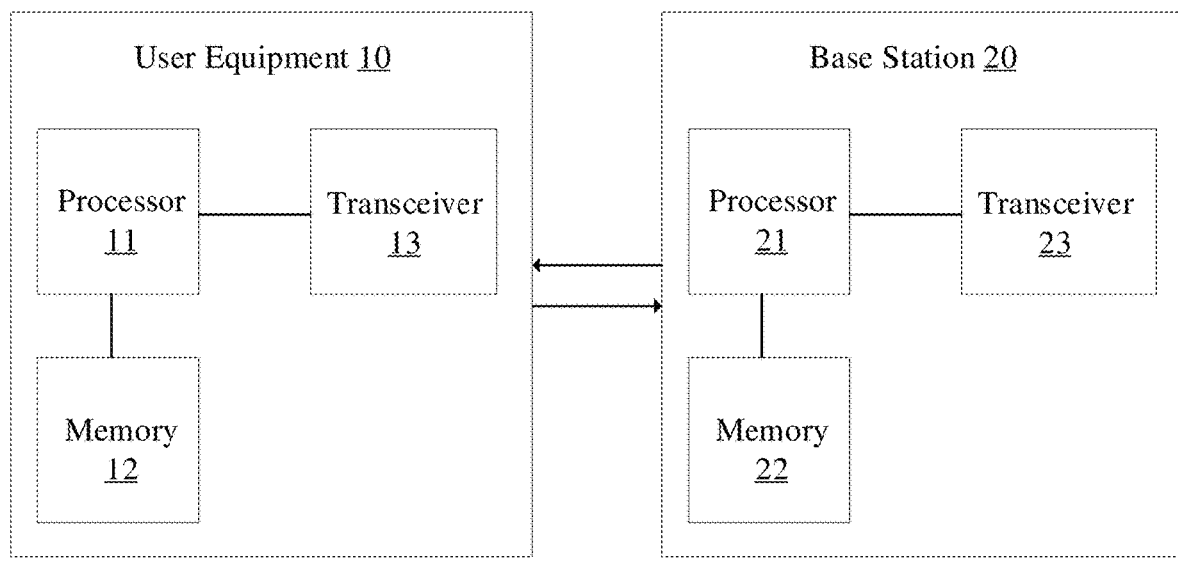
FIG. 4 is a block diagram of a user equipment (UE) and a base station for beam failure recovery according to an embodiment of the present disclosure.

FIG. 4 illustrates that, in some embodiments, a user equipment (UE) 10 and a base station 20 for beam failure recovery according to an embodiment of the present disclosure are provided. The UE 10 may include a processor 11, a memory 12, and a transceiver 13. The base station 20 may include a processor 21, a memory 22 and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include an application-specific integrated circuit (ASIC), other chipsets, logic circuit and/or data processing devices. The memory 12 or 22 may include a read-only memory (ROM), a random access memory (RAM), a flash memory, a memory card, a storage medium and/or other storage devices. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via various means are known in the art.

Each of the TRP 101 and TRP 102 is an embodiment of the BS 20. Alternatively, the TRP 101 and TRP 102 may be separate radio units that share a common base station, where the common base station is an embodiment of the BS 20. A UE 103 is an embodiment of the UE 10. The base stations may be further connected to a physical core network and/or a core network slice instance of a telecommunication operator.

In some embodiments, the processor 11 is configured to perform a method beam failure recovery according to an embodiment of the disclosure. The method of a beam failure recovery includes detecting a first set of beam failure detection reference signals (RSs) associated with a first control resource set (CORESET) group identifier (ID) and a second set of beam failure detection RSs associated with a second CORESET group ID; measuring the first set of beam failure detection RSs to detect a first beam failure event associated with the first CORESET group ID and the second set of beam failure detection RSs to detect a second beam failure event associated with the second CORESET group ID; transmitting a first beam failure recovery request message associated with the first CORESET group ID when the first beam failure event is detected, and a second beam failure recovery request message associated with the second CORESET group ID when the second beam failure event is detected; and monitoring a first search space for a first beam failure recovery response which responds to the first beam failure recovery request and a second search space for a second beam failure recovery response which responds to the second beam failure recovery request.

In some embodiments, the processor 21 configures, to the UE 10, a plurality of serving cells and configure the UE 10 to perform a method beam failure recovery on the serving cells.

In some embodiments, the processor 21 is configured to configure the UE 10 with a parameter that indicates the UE to perform the beam failure recovery for a bandwidth part (BWP) in a serving cell. In some embodiments, the processor 21 is configured to configuring the UE 10 with a new beam identification reference signal (NBI RS), which indicates the UE to perform the beam failure recovery for a BWP in the serving cell. In some embodiments, the processor 21 is configured to request the UE 10 to report an index of one NBI RS that is chosen by the UE 10 based on comparing a reference symbol received power (RSRP) threshold of the one NBI RS to a threshold. In some embodiments, the processor 21 is configured to configure the UE 10 with a beam failure detection reference signal (BFD RS), which indicates the UE to perform the beam failure recovery for a BWP in the serving cell. In some embodiments, the processor 21 receives a beam failure recovery request (BFRQ) from the UE 10 when the processor 21 requests the UE 10 to use a granted physical uplink shared channel (PUSCH) transmission to report a beam failure on the serving cell, and the processor 21 transmits, to the UE 10, a beam failure recovery response (BFRR) in response to the BFRQ.

In this disclosure, the methods of beam failure recovery for NR multi-TRP system are proposed. In the present disclosure, a 'beam' can correspond to an RS resource, which can be a CSI-RS resource, a sounding reference signal (SRS) resource, a synchronization signal/physical broadcast channel (SS/PBCH) block or any other type of RS. In the present disclosure, the 'beam failure recovery' function can also be called as 'link recovery' function.

In one embodiment, in a NR multi-TRP system, the UE, such as UE 103, can be configured to monitor the CORE- SETs used by each TRP to detect the beam failure event for each TRP. For the beam failure recovery of a first TRP, such as the TRP 101, the system can configure a set of beam failure detection reference signals (RSs) that are used by the UE to detect the beam failure event of that TRP. The system can configure a set of new beam identification reference signals that are used by the UE to find a new candidate beam for the first TRP when beam failure event happens at the first TRP. For the first TRP, the system can configure uplink RACH resource for the UE to send beam failure recovery request for the beam failure event of the first TRP, which may include new beam identification RSs configured for the first TRP to the UE. Furthermore, the system can also configure a beam failure recovery search space for the first TRP, in which the UE can be requested to detect gNB's response to the beam failure recovery request for the first TRP. In the beam failure recovery request message, the UE shall include one or more the following information explicitly or implicitly: the identification of the first TRP that meets beam failure event; and the identification of a new beam that is recommended by the UE to the network for the beam failure recovery of the first TRP.

For the first TRP, the UE can monitor the link quality by measuring the beam failure detection RSs configured for the first TRP. If the link quality of the beam failure detection RSs configured for the first TRP is worse than some threshold, the UE can claim a beam failure instance for the first TRP. If the UE meets consecutive M beam failure instances for the first TRP, the UE can claim a beam failure event for the first TRP, where M is a positive integer. The link quality of the beam failure detection RSs, for example, may be represented by signal to interference plus noise ratio (SINR), RSRP, or BLER. For the beam failure recovery request, the UE measures the new beam identification RSs that is configured for the first TRP and select one RS that satisfies the quality requirement, for example, RSRP being larger than some threshold. Then the UE can send a beam failure recovery request for beam failure recovery of the first TRP to a telecommunication network, such as the system. The beam failure recovery request implicitly or explicitly represents the information including the first TRP that meets the beam failure event and one ID of RS that is selected as the new beam that the system can use for downlink transmission during beam failure recovery procedure for the first TRP.

After sending the beam failure recovery request for the first TRP, the UE can begin to monitor PDCCH that is dedicatedly configured for monitoring gNB's response for the beam failure recovery request for the first TRP. After the beam failure recovery request for the first TRP is successfully sent, the UE starts to determine some default Tx beams for the following channels:

PUCCH resources that are used to transmit UCI to the first TRP: the UE can determine a default Tx beam shall be applied on those PUCCH resource. The default Tx beam can be the Tx beam the UE used to transmit the beam failure recovery request for the first TRP successfully; and CORESET #0 (or called CORESET with index 0) that is used by the first TRP: If the CORESET #0 (the CORESET with index 0) is used by the first TRP for PDCCH transmission, the UE shall determine that the QCL configuration for CORESET #0 is updated to the new beam RS which is recommended by the UE for beam failure recovery for the first TRP.

The UE can continue monitoring the search space configured for beam failure recovery for the first TRP until the Tx beam for PDCCHs used by the first TRP are updated or switched by the network.

In one method, a UE, such as the UE 103, is configured in the multi-TRP system with $N_1$ TRPs. The UE can be configured with M CORESETs $\{P_1, P_2, \ldots, P_M\}$. In the configuration of one CORESET $P_m$, the UE can be configured with an association between CORESET $P_m$ and a CORESET group ID. Each of the variables $N_1$, M, and m is a positive integer. For example, the value of CORESET group ID can be 0 or 1. Some of the CORESETs among $\{P_1, P_2, \ldots, P_M\}$ are associated with CORESET group ID=0, and some of the CORESETs among $\{P_1, P_2, \ldots, P_M\}$ are associated with CORESET group ID=1. The configuration of beam failure recovery is configured per CORESET group ID value. The UE can be configured with one or more of the following parameters in beam failure recovery configuration:

An association between the beam failure configuration and a CORESET group ID P;

Configuration IDs of a first set of RSs that are used as beam failure detection RS for the PDCCH channels corresponding to the associated CORESET group ID P;

If the UE is not provided the first set of RSs, the UE can determine the first set of RSs according to the TCI-states configured to the CORESETs that are associated with the CORESET group ID P;

A first threshold for measuring beam failure detection RS for the PDCCH channels corresponding to the associated CORESET group ID P;

Configuration IDs of a second set of RSs that are used as new beam identification RS for the beam failure recovery for the PDCCH channels corresponding to the associated CORESET group ID P;

A second threshold for selecting one new beam RS from the second set for beam failure recovery for the PDCCH channels corresponding to the associated CORESET group ID P;

A set of uplink RACH resources that can be used to transmit beam failure recovery request message for beam failure recovery of the PDCCH channels corresponding to the associated CORESET group ID P; and A search space that is configured for beam failure recovery for the associated CORESET group ID P.

After receiving the configuration associated with CORESET group ID P, the UE can start the procedure of beam failure recovery for PDCCHs associated with CORESET group ID P. In an embodiment of the disclosure, the UE starts the procedure of beam failure recovery for the TRP that is identified by the CORESET group ID P.

Figure 5:
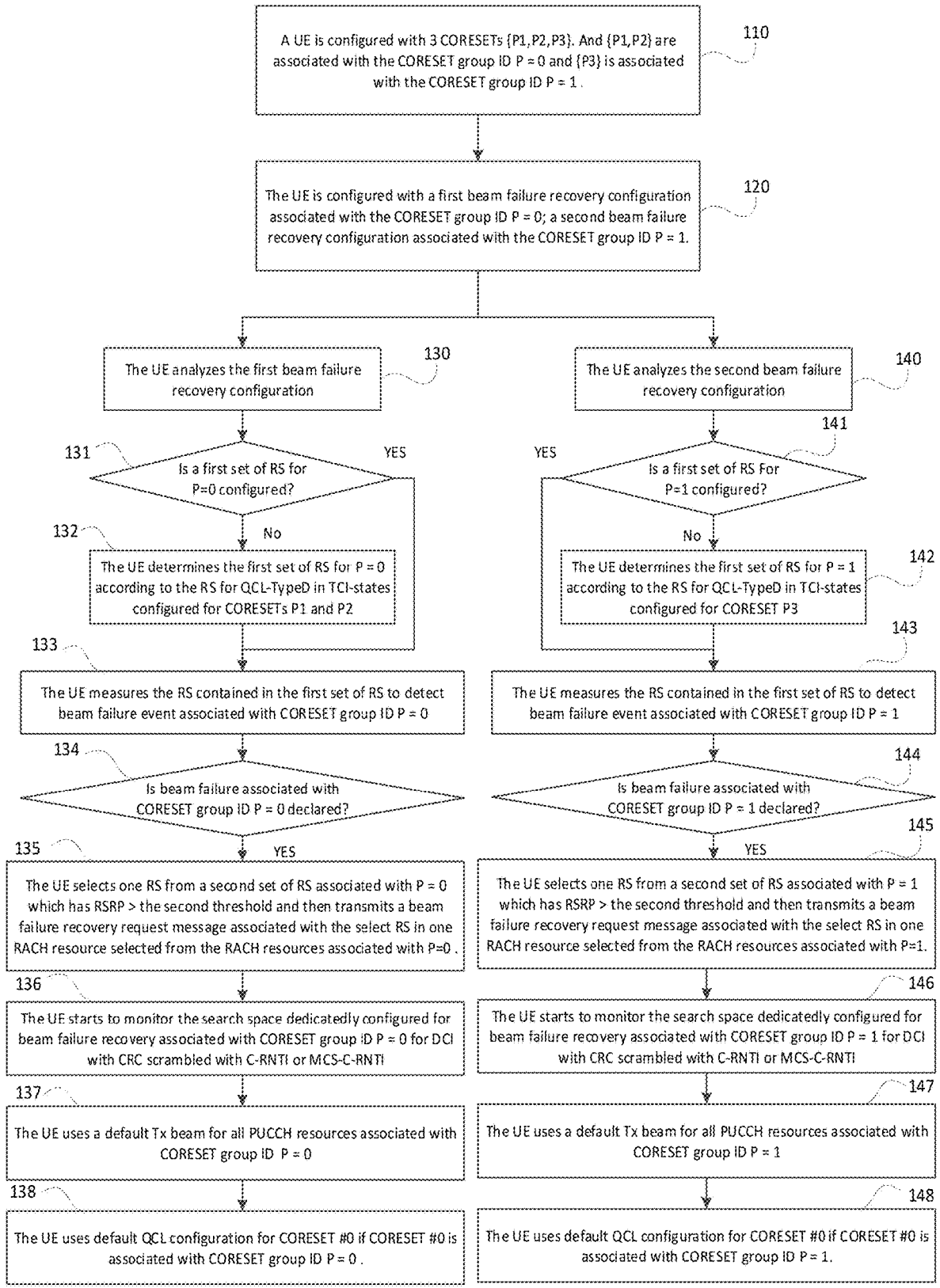
FIG. 5 is a flowchart illustrating a method for beam failure recovery according to an embodiment of the present disclosure.

FIG. 5 illustrates an example of the method for beam failure recovery in the NR multi-TRP system according to an embodiment of the disclosure. As shown in the example of FIG. 5, a UE, such as the UE 103, is configured in a multi-TRP system with 2 TRPs. Three CORESETs $\{P_1, P_2, P_3\}$ are configured for the UE. CORESETs $P_1$ and $P_2$ are used by the first TRP, which is associated with P=0 of the CORESET group ID and CORESET $P_3$ is used by a second TRP, such as the TRP 102, which is associated with P=1 of the CORESET group ID.

In block 110, a UE, such as the UE 103, is configured with three CORESETs $\{P_1,P_2,P_3\}$. The CORESETs $\{P_1,P_2\}$ are associated with the CORESET group ID P=0, and CORESET $\{P_3\}$ is associated with the CORESET group ID P=1.

In block 120, the UE is configured with a first beam failure recovery configuration associated with P=0; a second beam failure recovery configuration associated with P=1.

In blocks 130 and 140, the UE analyzes the first and the second beam failure recovery configuration.

In blocks 131 and 141, the UE determines whether a first set of RS for P=0 and a first set of RS for P=1 are configured? If the first set of RS for P=0 is not configured, the UE determines the first set of RS for P=0 according to the RS for QCL-TypeD in TCI-states configured for CORESETs $P_1$ and $P_2$ in block 132. If the first set of RS for P=0 is configured, the UE measures the RS contained in the first set of RS to detect beam failure event associated with CORESET group ID P=0 in block 133. If the first set of RS for P=1 is not configured, the UE determines the first set of RS for P=1 according to the RS for QCL-TypeD in TCI-states configured for CORESET $P_3$ in block 142. If the first set of RS for P=1 is configured, the UE measures the RS contained in the first set of RS to detect beam failure event associated with CORESET group ID P=1 in block 143.

In block 134, the UE determines whether a beam failure event associated with CORESET group ID P=0 is declared. In block 144, the UE determines whether a beam failure event associated with CORESET group ID P=1 is declared.

In block 135, the UE selects one RS from a second set of RS associated with P=0 which has RSRP>the second threshold and then transmits a beam failure recovery request message associated with the select RS in one RACH resource selected from the RACH resources associated with P=0. In block 145, the UE selects one RS from a second set of RS associated with P=1 which has RSRP>the second threshold and then transmits a beam failure recovery request message associated with the select RS in one RACH resource selected from the RACH resources associated with P=1.

The UE starts to monitor the search space dedicatedly configured for beam failure recovery associated with CORESET group ID P=0 for DCI with CRC scrambled with C-RNTI or MCS-C-RNTI in block 136, and monitor the search space dedicatedly configured for beam failure recovery associated with CORESET group ID P=1 for DCI with CRC scrambled with C-RNTI or MCS-C-RNTI in block 146.

The UE uses a default Tx beam for all PUCCH resources associated with CORESET group ID P=0 in block 137, and a default Tx beam for all PUCCH resources associated with CORESET group ID P=1 in block 147.

In block 138, the UE uses default QCL configuration for CORESET #0 (CORESET with index 0) if CORESET #0 (CORESET with index 0) is associated with CORESET group ID P=0. In block 148, the UE uses default QCL configuration for CORESET #0 if CORESET #0 (CORESET with index 0) is associated with CORESET group ID P=1.

Figure 6:
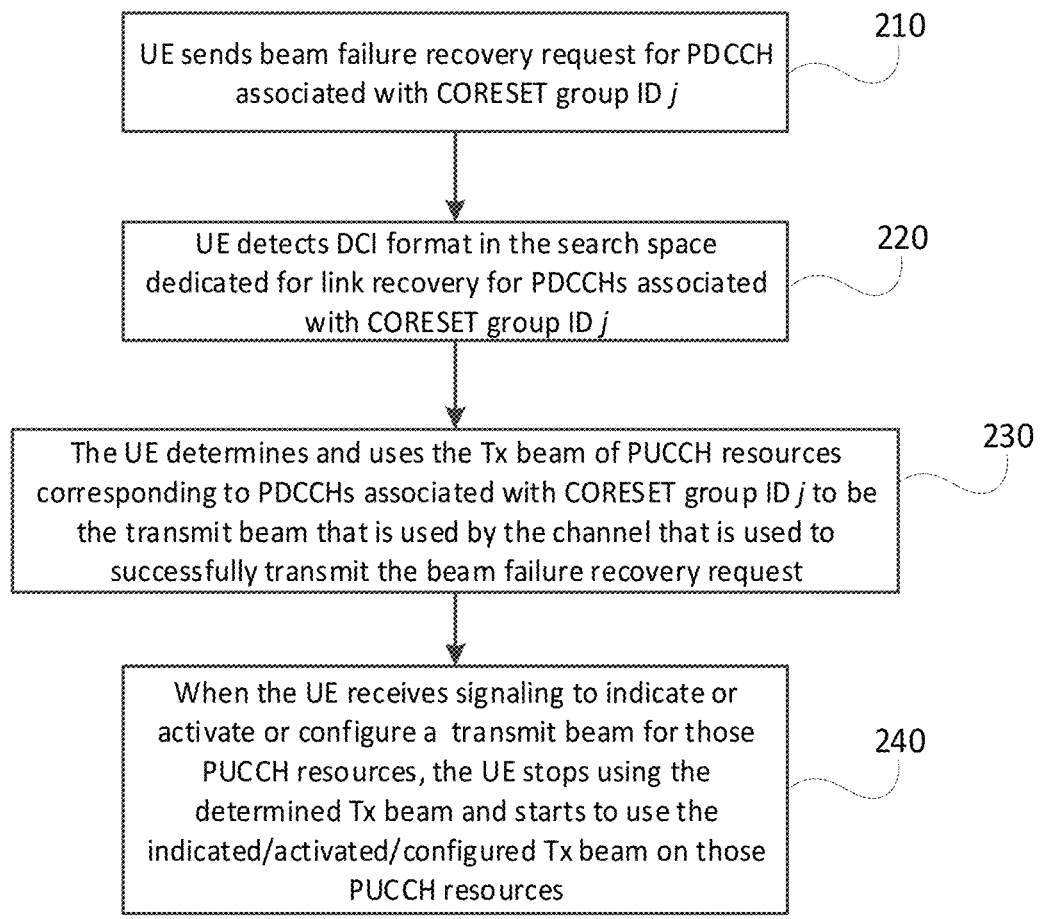
FIG. 6 is a flowchart illustrating a method for beam failure recovery according to an alternative embodiment of the present disclosure.

As shown in FIG. 6, the UE can operate beam failure recovery procedure for the first TRP and the second TRP separately. The proposed method is applicable to both of the NR multi TRP deployment scenarios with either ideal backhaul or non-ideal backhaul.

Default beam configuration for PUCCH is detailed in the following.

In a NR multi-TRP system, a UE can transmit UCI (uplink control information) to different TRPs. For example, the UE can send HARQ ACK/NACK to different TRP for the PDSCH received from each TRP. The UE might use different PUCCH resource for the PUCCH transmission to different TRPs. The UE generally uses different uplink transmit beams. When a PDCCH of one TRP meet beam failure, a PUCCH used by that TRP could meet beam failure too. Therefore, during the beam failure recovery for the PDCCH of one TRP, the UE can be requested to identify a default Tx beam used by the TRP for the PUCCH resources.

In one embodiment, during the beam failure recovery for PDCCH corresponding to a first TRP, the UE can be requested to apply a default transmit beam on all the PUCCH resources that are used to transmit UCI to the first TRP until the UE receives media access control (MAC) control element (CE) or RRC signaling that indicates or reconfigures Tx beam for those PUCCH resources.

In one method, after the UE sends PRACH transmission with beam failure recovery request for the PDCCHs associated with the value j of the higher layer parameter CORESET-Group-Id, the UE starts to monitor PDCCH in a search space that is dedicatedly configured for link recovery for the PDCCHs associated with the value j of the higher layer parameter CORESET-Group-Id. When the UE detects a DCI format with CRC scrambled with cell-radio network temporary identifier (C-RNTI) or modulation coding scheme cell RNTI (MCS-C-RNTI), the UE can determine that beam failure recovery request was received by the gNB successfully. Since then, the UE can transmit PUCCH using resources that are associated with the value j of the higher layer parameter CORESET-Group-Id with the same spatial domain transmit filter as the one used to transmit the PRACH transmission carrying the beam failure recovery request that was successfully received by the gNB. The UE shall use the resources to transmit PUCCH until the UE receives signaling (for example MAC CE or RRC) to activate, indicate or configure spatial relation information for those PUCCH resources.

FIG. 6 illustrates a procedure of PUCCH beam indication during beam failure recovery in a multi-TRP system according to the method for beam failure recovery in an embodiment of the disclosure.

The example shown in FIG. 6 is a procedure of UE beam failure recovery for a first TRP in a multi-TRP system. In an embodiment of the disclosure, the first TRP can be associated with a CORESET group ID being set to value j. After the UE detects beam failure event for one TRP, the UE sends beam failure recovery request for PDCCH associated with value j of CORESET group ID in 210. That is, the UE sends beam failure recovery request for the first TRP, which can be associated with of CORESET group ID being set to j according an embodiment of the system. After sending the beam failure recovery request for the first TRP, the UE monitors PDCCH in a search space that is dedicatedly configured for beam failure recovery for the first TRP. At 220, the UE detects a DCI format with CRC scrambled with C-RNTI or MCS-C-RNTI in that search space. Then in 230, the UE starts to use a default Tx beam on any PUCCH resource that is associated with CORESET group ID j, i.e., the PUCCH resources used for the first TRP. The default Tx beam shall be the Tx beam used to successfully transmit the beam failure recovery request for the first TRP. At 240, after the UE receives signaling, so called spatial relation information, to indicate/activate/configure Tx beam for those PUCCH resources used by the first TRP, the UE can stop using that default Tx beam and start using the newly indicated Tx beam.

Default beam configuration for CORESET is detailed in the following.

For the CORESET #0 (or called CORESET with index 0), the UE shall switch the Tx beam to a default value after beam failure recovery. In the multi-TRP system, the UE shall only switch the Tx beam of CORESET #0 (CORESET with index 0) to a default value after the beam failure recovery procedure for the TRP where CORESET #0 (CORESET with index 0) is configured. While during the beam failure recovery for a TRP where CORESET #0 is (CORESET with index 0) not configured, the UE shall not switch the Tx beam for the CORESET #0 (CORESET with index 0).

In one embodiment, the UE shall switch the Tx beam for the CORESET #0 to the new identified beam after the UE receives gNB's response to the beam failure recovery request for one particular TRP.

In one method, after the UE sends PRACH transmission with beam failure recovery request for the PDCCHs associated with the value $J_0$ of the higher layer parameter CORESET-Group-Id, the UE starts to monitor PDCCH in a search space that is dedicatedly configured for link recovery for PDCCHs associated with the value $J_0$ of the higher layer parameter CORESET-Group-Id. When the UE detects a DCI format with CRC scrambled with C-RNTI or MCS-C-RNTI, the UE can determine that beam failure recovery request was received by the gNB successfully. Since then, the UE can determine and use the DM-RS antenna ports of the CORESET #0 (CORESET with index 0) to be quasi collocated with the new beam identified for beam failure recovery for PDCCHs associated with the value $J_0$ of the higher layer parameter CORESET-Group-Id. The value $J_0$ can be pre-defined or configured, and an example $J_0$ is 0.

Figure 7:
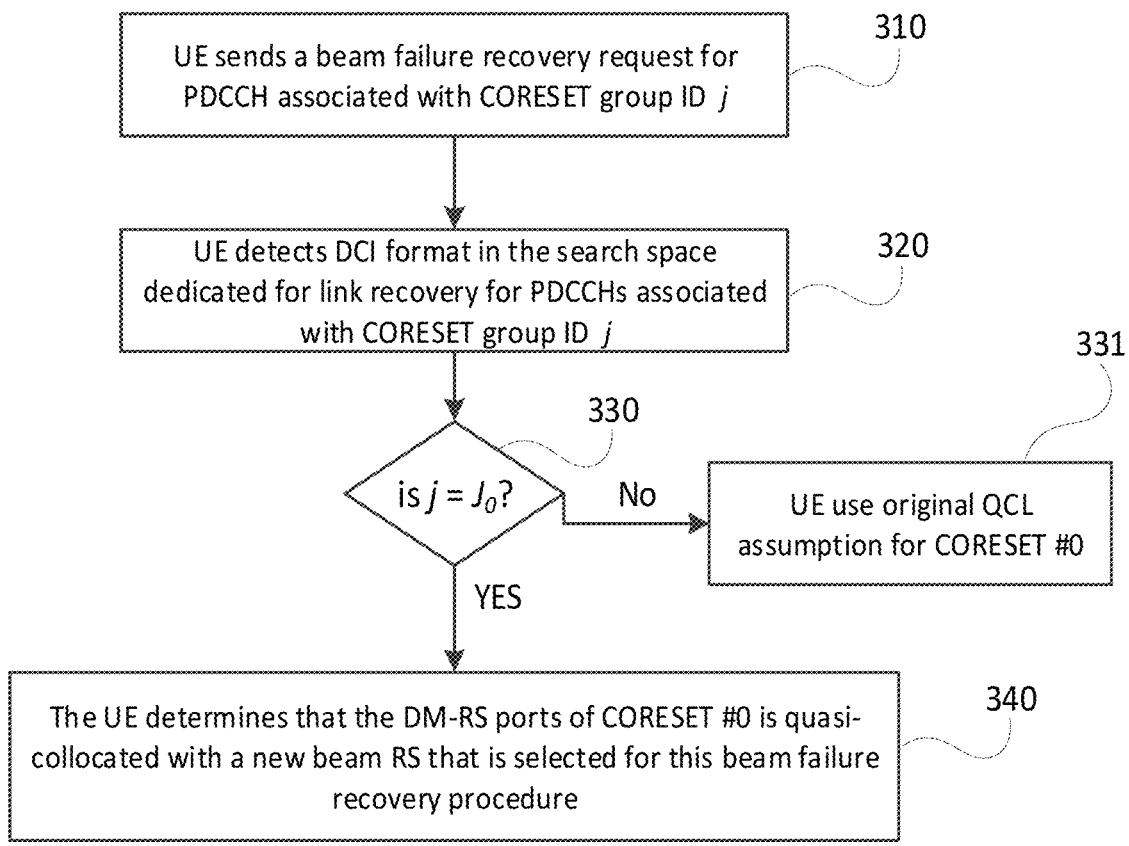
FIG. 7 is a flowchart illustrating a method for beam failure recovery according to an alternative embodiment of the present disclosure.

FIG. 7 illustrates an example of beam indication for CORESET #0 (CORESET with index 0) during beam failure recovery in a multi-TRP system according to an embodiment of the disclosure. The example shown in FIG. 7 is a procedure of UE beam failure recovery for a first TRP in a multi-TRP system. In an embodiment of the disclosure, the first TRP can be associated with CORESET group ID being set to value j. After the UE detects beam failure event for one TRP, the UE sends beam failure recovery request for PDCCH associated with value j of CORESET group ID in 310. That is, the UE sends beam failure recovery request for the first TRP, which can be associated with CORESET group ID being set to j according to an embodiment of the system. After sending the beam failure recovery request for the first TRP, the UE monitors PDCCH in a search space that is dedicatedly configured for beam failure recovery for the first TRP. At 320, the UE detects a DCI format with CRC scrambled with C-RNTI or MCS-C-RNTI in that search space. In 330, the UE determines whether j is equal to $J_0$ or not. If j is not equal to $J_0$, in 331, the UE uses original QCL assumption, that is QCL configuration, for CORESET #0. If j is equal to $J_0$, in 340, the UE determines that the DM-RS ports of the CORESET #0 is quasi-collocated with a new beam RS that is identified and selected for this beam failure recovery procedure for the first TRP in this example. The UE uses configuration of the new beam RS for the CORESET #0.

Suggested text for standard specification is detailed in the following.

In an embodiment of the disclosure, for each DL BWP configured to a UE in a serving cell, a UE can be provided by higher layer signaling with P CORESETs. For each CORESET, the UE is provided with a higher layer parameter CORESET-Group-Id, which can takes the value of 0, 1, 2, ... and the similar. In one example, the higher layer parameter CORESET-Group-Id can take two possible values: 0 or 1, to represent two TRPs. All the CORESETs with CORESET-Group-Id being set to 0 are used by a first TRP to send DCI and all the CORESETs with CORESET-Group-Id being set to 1 are used by a second TRP to send DCI. For the link recovery for each TRP, the UE can be provided, for a given BWP in a serving cell, a set $\bar{q}_{0,j}$ of periodic CSI-RS resources that is associated with the higher layer parameter CORESET-Group-Id being set to be j. For example, j can be 0 or 1. Please note here the set $\bar{q}_{0,j}$ of periodic CSI-RS resource is used by the UE to detect beam failure of the TRP identified by the CORESET-Group-Id being set to be j. If the UE is not configured with the set $\bar{q}_{0,j}$, the UE determines the set $\bar{q}_{0,j}$ to include periodic CSI-RS resource configuration indexes with the same value as RS indexes in the RS sets indicated by TCI-state for respective CORESETs associated with higher layer parameter CORESET-Group-Id being set to be j. If there are two RS indexes in a TCI state, the set $\bar{q}_{0,j}$ includes RS indexes with QCL-TypeD configuration for the corresponding TCI-states. For a given BWP in a serving cell, the UE expects to be configured with the set $\bar{q}_{0,j}$ or determine the set $\bar{q}_{0,j}$ for all the values of higher layer parameter CORESET-Group-Id configured in the CORESETs in the given BWP of the serving cell.

The UE can be configured with a set $\bar{q}_{1,j}$ of periodic CSI-RS resource configuration indexes and/or SS/PBCH block indexes that is associated with the higher layer parameter CORESET-Group-Id being set to be j. The set $\bar{q}_{1,j}$ is configured for radio link quality measurement associated with the higher layer parameter CORESET-Group-Id being set to be j for a given BWP in a serving cell.

The UE can be provided with two thresholds: $Q_{out,LR}$ and $Q_{in,LR}$. In one example, these two thresholds are configured to be associated with the higher layer parameter CORESET-Group-Id. For example, these two thresholds are configured independently from the higher layer parameter CORESET-Group-Id, and the UE can apply the configured threshold to beam failure recovery for PDCCH associated with any CORESET-Group-Id in a given BWP of a serving cell.

A UE can be provided with a CORESET and a search space that are dedicated for link recovery associated with the higher layer parameter CORESET-Group-Id being set to be j. For link recovery associated with the higher layer parameter CORESET-Group-Id being set to be j, the UE shall monitor PDCCH in the search space associated with the higher layer parameter CORESET-Group-Id being set to be j.

The UE can be configured with dedicated PRACH resources that is used for link recovery for the PDCCHs associated with the higher layer parameter CORESET-Group-Id being set to be j.

To detect the beam failure on PDCCHs associated with one higher layer parameter CORESET-Group-Id, i.e. the PDCCHs used by one TRP in a multi-TRP system, the UE shall access the radio link quality according to the corresponding set of beam failure detection RSs against the associated threshold. The physical layer in UE can report a beam failure indication for the associated higher layer parameter CORESET-Group-Id to a higher layer. The physical layer in the UE accesses the radio link quality according to the set $\bar{q}_{0,j}$ of resource configuration associated with CORESET-Group-Id being set to be j against the threshold $Q_{out,LR}$ that is associated with CORESET-Group-Id being set to be j. For the set $\bar{q}_{0,j}$, the UE accesses the radio link quality only according to periodic CSI-RS resource configurations or SS/PBCH blocks that are quasi co-located with the DM-RS of PDCCH received in a search space that is associated with a CORESET that is configured with CORESET-Group-Id being set to be j.

The physical layer in the UE shall provide an indication associated with CORESET-Group-Id being set to be j to the higher layer when the radio link quality for corresponding resource configurations in the set $\bar{q}_{0,j}$ that the UE uses to access the radio link quality is worse than the threshold $Q_{out,LR}$ that is associated with CORESET-Group-Id being set to be j. For each value j of the higher layer parameter CORESET-Group-Id, the physical layer in the UE informs the higher layers in the UE when the radio link quality is worse than the associated threshold with a periodicity determined by the maximum between the shortest periodicity and x millisecond. The shortest periodicity is among the periodic CSI-RS configurations in the set $\bar{q}_{0,j}$ that the UE uses to access the radio link quality associated with CORESET-Group-Id being set to be j.

The higher layers can request the physical layer to provide the CSI-RS configuration indexes and/or SS/PBCH block indexes to the higher layer for link recovery associated with CORESET-Group-Id being set to be j. Upon receiving a request from higher layers for the higher layer parameter CORESET-Group-Id j, i.e., the request from higher layers for the CORESET associated with the higher layer parameter CORESET-Group-Id being set to j, the UE provides to higher layers the periodic CSI-RS configuration indexes and/or SS/PBCH blocks from the set $\hat{q}_{1,j}$ and the corresponding L1-RSRP measurements that are not less than the threshold $Q_{in,LR}$ that is associated with CORESET-Group-Id being set to j.

The MAC entity may be configured by RRC with a beam failure recovery procedure for the PDCCH detected from search space associated with CORESET associated with higher layer parameter CORESET-Group-Id being set to j, which is used for indicating to the serving gNB of a new synchronization signal block (SSB) or CSI-RS when beam failure is detected on the serving SSB(s) or CSI-RS(s) for the PDCCHs associated with the higher layer parameter CORESET-Group-Id being set to j. For each of CORESET-Group-Id j, the beam failure is detected by counting beam failure instance indications for the value j from lower layers to the MAC entity. For beam failure recovery procedure for each value j of the higher layer parameter CORESET-Group-Id, the MAC entity of the UE shall do the following procedure:
  BFI_COUNTER: a counter which is initially set to 0 for counting beam failure instance indication for value j;
  If the beam failure instance indication associated the value j of the higher layer parameter CORESET-Group-Id has been received from lower layers:
    Start or restart the beamFailureDetectionTimer that is associated with the value j of the higher layer parameter CORESET-Group-Id;
    Increment BFI_COUNTER by 1;
    If BFI_COUNTER>=beamFailureInstanceMaxCount that is associated with the value j of the higher layer parameter CORESET-Group-Id,
      The MAC entity initiates a RACH procedure to send the beam failure recovery request for the PDCCHs associated with the higher layer parameter CORESET-Group-Id being set to j;
  If the beamFailureDetectionTimer that is associated with the value j of the higher layer parameter CORESET-Group-Id expires, or if the higher layer reconfigures the beamFailureDetectionTimer that is associated with the value j of the higher layer parameter CORESET-Group-Id, beamFailureInstanceMaxCount that is associated with the value j of the higher layer parameter CORESET-Group-Id or any of the reference signal used for beam failure detection for the PDCCHs that is associated with the value j of the higher layer parameter CORESET-Group-Id, the UE set BFI_COUNTER that is associated with the value j of the higher layer parameter CORESET-Group-Id to 0;
  If the RACH procedure for sending beam failure recovery request for the PDCCHs that are associated with the value j of the higher layer parameter CORESET-Group-Id is successfully completed,
    The UE sets BFI_COUNTER that is associated with the value j of the higher layer parameter CORESET-Group-Id to 0;
    Stop the beamFailureRecoveryTimer that is associated with the value j of the higher layer parameter CORESET-Group-Id; and
    The UE can determine that the beam failure recovery procedure for the PDCCHs that are associated with the value j of the higher layer parameter CORESET-Group-Id has successfully completed.

Upon detecting beam failure event on PDCCHs associated with value j of the higher layer parameter CORESET-Group-Id, i.e., detecting the beam failure on PDCCH used by one TRP, the UE can send PRACH. The PRACH resource is selected based on one periodic CSI-RS resource configuration or SS/PBCH block associated with index $q_{new,j}$ that is selected from the set $\bar{q}_{1,j}$ and is provided by higher layers. For such a PRACH transmission in slot n, the UE monitors PDCCH in the search space dedicatedly configured for link recovery for the CORESETs associated with the value j of the higher layer parameter CORESET-Group-Id to detect a DCI format with CRC scrambled with C-RNTI or MCS-C-RNTI starting from n+k slot within a time window. The UE shall monitor the search space dedicatedly configured for link recovery for the CORESETs associated with the value j of the higher layer parameter CORESET-Group-Id until the UE receives reconfiguration or activation for a TCI-state for any of the CORESETs that are associated with CORESET-Group-Id being set to j. For PDCCH monitoring in the search space dedicatedly configured for link recovery for the CORESETs associated with the value j of the higher layer parameter CORESET-Group-Id and the corresponding PDSCH reception, the UE shall use the same antenna port quasi-colocation parameters as the ones associated with index $q_{new,j}$ until the UE receives reconfiguration or activation for a TCI-state for any of the CORESETs that are associated with CORESET-Group-Id being set to j. After the UE detects a DCI format with CRC scrambled by C-RNTI or MCS-C-RNTI in the search space dedicatedly configured for the link recovery for PDCCHs associated with CORESET-Group-Id being set to j, the UE continue to monitor PDCCH candidates in that search space until UE receives a MAC CE activation command for a TCI-state or TCI-state reconfiguration for at least one CORESET that is associated with CORESET-Group-Id being set to j.

After X symbols from a last symbol of a first PDCCH reception in the search space dedicatedly configured for link recovery for PDCCHs associated with CORESET-Group-Id being set to j, for which the UE detects a DCI format with CRC scrambled by C-RNTI or MCS-C-RNTI, the UE shall transmit the PUCCH resources that is associated with the value j of the higher layer parameter CORESET-Group-Id with the a same spatial domain transmit filter as used by the last PRACH transmission. The last PRACH transmission can be the one corresponding to the DCI format with CRC scrambled by C-RNTI or MCS-C-RNTI detected in the PDCCHs in the search space associated with CORESET-Group-Id being set to j. For those PUCCH resources, the UE shall use a power determined with parameters $q_u=0$, $q_d=q_{new,j}$, and l=0. The UE shall use the PUCCH resources until the UE receives an activation command for the spatial relation information for those PUCCH resources or RRC reconfiguration of the spatial relation information for those PUCCH resources.

After X symbols from a last symbol of a first PDCCH reception in the search space dedicatedly configured for link recovery for PDCCHs associated with CORESET-Group-Id being set to $J_0$, where $J_0$ is a predefined value, such as $J_0=0$, or in the search space dedicatedly configured for link recovery for PDCCHs that is not associated higher layer parameter CORESET-Group-Id, for which the UE detects a DCI format with CRC scrambled by C-RNTI or MCS-C-RNTI, the UE shall determine and use same antenna port quasi-colocation parameters as the ones associated with index $q_{new,J_0}$ or $q_{new}$ for PDCCH monitoring in a CORESET with index 0.

According to an embodiment of the disclosure, in a multi-TRP system, the UE is able to conduct beam failure recovery function for each TRP separately. For each TRP, the UE may monitor the PDCCHs used by the TRP and when the beam failure of that TRP is detected, and send beam failure recovery request dedicated for that TRP to request the network to recovery the beam links between that TRP and the UE. The proposed methods in an embodiment of the disclosure provides fundamental mechanisms to support beam failure recovery function in NR multi-TRP system, especially for the multi-TRP system deployment with non-ideal backhaul.

Figure 8:
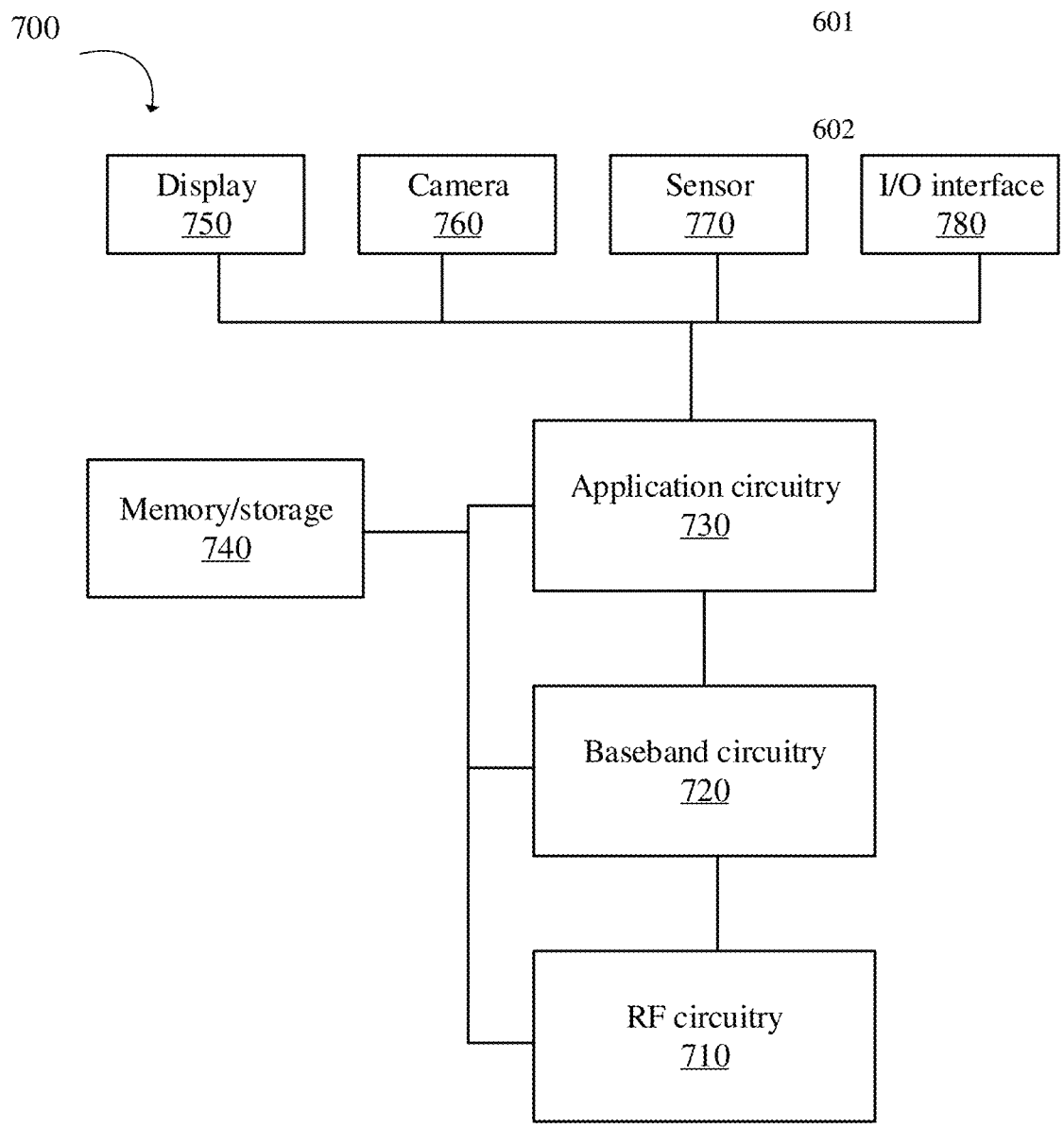
FIG. 8 is a block diagram of a system for wireless communication according to an embodiment of the present disclosure.

FIG. 8 is a block diagram of a system 700 for wireless communication according to an embodiment of the present disclosure. Embodiments described herein may be implemented into the system using any suitably configured hardware and/or software. For example, each of the UE 10 and the UE 103 may be realized as the system 700. FIG. 8 illustrates the system 700 including a radio frequency (RF) circuitry 710, a baseband circuitry 720, an application circuitry 730, a memory/storage 740, a display 750, a camera 760, a sensor 770, and an input/output (110) interface 780, coupled with each other at least as illustrated.

The application circuitry 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In the embodiment of the present disclosure, an apparatus and a method for beam failure recovery capable of providing high reliability are provided. The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with some embodiments, it is understood that the present disclosure is not limited to the disclosed embodiments but is intended to cover various arrangements made without departing from the scope of the broadest interpretation of the appended claims.

What is claimed is:

1. A method for beam failure recovery executable by an apparatus, comprising:
   detecting a first set of beam failure detection reference signals (RSs) associated with a first control resource set (CORESET) group identifier (ID);
   measuring the first set of beam failure detection RSs to detect a first beam failure event associated with the first CORESET group ID;
   transmitting a first beam failure recovery request message associated with the first CORESET group ID when the first beam failure event is detected; and
   monitoring a search space for a first beam failure recovery response which responds to the first beam failure recovery request,
   wherein the method further comprises:
   selecting a first set of new beam identification RSs associated with the first CORESET group ID, of which link quality is measured as greater than a first threshold; and
   transmitting a random access channel (RACH) preamble associated with the first set of new beam identification RSs for a beam failure recovery process associated with the first CORESET group ID, wherein the RACH preamble comprises the first beam failure recovery request.

2. The method of claim 1, further comprising:
   using a first default transmit beam for physical uplink control channel (PUCCH) resources associated with the first CORESET group ID.

3. The method of claim 2, further comprising:
   receiving a signal indicating a first new transmit beam for the PUCCH resources associated with the first CORESET group ID; and
   using the first new transmit beam for the PUCCH resources associated with the first CORESET group ID.

4. The method of claim 1, further comprising:
   using a configured quasi co-location (QCL) configuration for a CORESET with index 0 when the CORESET with index 0 is associated with the first CORESET group ID.

5. The method of claim 4, further comprising:
   obtaining new QCL configuration according to the first beam failure recovery response; and
   using the new QCL configuration for the CORESET with index 0 to replace the configured QCL configuration.

6. The method of claim 1, further comprising:
   detecting a second set of beam failure detection RSs associated with a second CORESET group ID;
   measuring the second set of beam failure detection RSs to detect a second beam failure event associated with the second CORESET group ID;
   transmitting a second beam failure recovery request message associated with the second CORESET group ID when the second beam failure event is detected; and
   monitoring a search space for a second beam failure recovery response which responds to the second beam failure recovery request.

7. The method of claim 6, further comprising:
   using a second default transmit beam for physical uplink control channel (PUCCH) resources associated with the second CORESET group ID.

8. The method of claim 7, further comprising:
   receiving a signal indicating a second new transmit beam for the PUCCH resources associated with the second CORESET group ID; and using the second new transmit beam for the PUCCH resources associated with the second CORESET group ID.

9. The method of claim 6, further comprising:
using a configured quasi co-location (QCL) configuration for a CORESET with index 0 when the CORESET with index 0 is associated with the second CORESET group ID;
obtaining new QCL configuration according to the second beam failure recovery response; and
using the new QCL configuration for the CORESET with index 0 to replace the configured QCL configuration.

10. An apparatus for beam failure recovery, comprising:
a transceiver configured for receiving reference signals (RSs); and
a processor configured for detecting a first set of beam failure detection RSs associated with a first control resource set (CORESET) group identifier (ID);
wherein the processor measures the first set of beam failure detection RSs to detect a first beam failure event associated with the first CORESET group ID;
wherein the processor transmits a first beam failure recovery request message associated with the first CORESET group ID when the first beam failure event is detected;
wherein the processor monitors a search space for a first beam failure recovery response which responds to the first beam failure recovery request, and
wherein the processor further selects a RS from a first set of new beam identification RSs associated with the first CORESET group ID, of which link quality is measured as greater than a first threshold, and the processor transmits a random access channel (RACH) preamble associated with the RS selected from the first set of new beam identification RSs for a beam failure recovery process associated with the first CORESET group ID, wherein the RACH preamble comprises the first beam failure recovery request.

11. The apparatus of claim 10, wherein the processor further uses a first default transmit beam for physical uplink control channel (PUCCH) resources associated with the first CORESET group ID.

12. The apparatus of claim 11, wherein the processor further receives a signal indicating a first new transmit beam for the PUCCH resources associated with the first CORESET group ID, and uses the first new transmit beam for the PUCCH resources associated with the first CORESET group ID.

13. The apparatus of claim 10, wherein the processor further uses a configured quasi co-location (QCL) configuration for a CORESET with index 0 when the CORESET with index 0 is associated with the first CORESET group ID.

14. The apparatus of claim 13, wherein the processor further obtains new QCL configuration according to the first beam failure recovery response, and uses the new QCL configuration for the CORESET with index 0 to replace the configured QCL configuration.

15. The apparatus of claim 10, wherein the processor further detects a second set of beam failure detection RSs associated with a second CORESET group ID, and measures the second set of beam failure detection RSs to detect a second beam failure event associated with the second CORESET group ID;
wherein the transceiver transmits a second beam failure recovery request message associated with the second CORESET group ID when the second beam failure event is detected; and
wherein the processor monitors a search space for a second beam failure recovery response which responds to the second beam failure recovery request.

16. The apparatus of claim 15, wherein the processor further uses a second default transmit beam for physical uplink control channel (PUCCH) resources associated with the second CORESET group ID.

17. The apparatus of claim 16, wherein the processor receives a signal indicating a second new transmit beam for the PUCCH resources associated with the second CORESET group ID, and uses the second new transmit beam for the PUCCH resources associated with the second CORESET group ID.

18. The apparatus of claim 15, wherein the processor further uses a configured quasi co-location (QCL) configuration for a CORESET with index 0 when the CORESET with index 0 is associated with the second CORESET group ID;
wherein the processor obtains new QCL configuration according to the second beam failure recovery response, and uses the new QCL configuration for the CORESET with index 0 to replace the configured QCL configuration.

* * * * *